United States Patent
Sasaki (12)

(10) Patent No.: US 6,249,397 B1
(45) Date of Patent: *Jun. 19, 2001

(54) DEVICE FOR READING AND WRITING DATA ON MAGNETIC RECORDING LAYER OF PHOTO FILM

(75) Inventor: Wataru Sasaki, Saitama (JP)

(73) Assignee: Fuji Photo Film Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/867,588

(22) Filed: Jun. 2, 1997

(30) Foreign Application Priority Data

Jun. 5, 1996 (JP) ................................... 8-143105

(51) Int. Cl.$^7$ .................................... G11B 15/12

(52) U.S. Cl. .................. 360/62; 360/3; 360/61; 360/67; 360/68; 396/311; 396/319

(58) Field of Search .................... 360/3, 61, 62, 360/67, 68; 396/311, 319

(56) References Cited

U.S. PATENT DOCUMENTS

| | | | |
|---|---|---|---|
| 4,063,293 | * 12/1977 | Perahia | 360/62 |
| 4,518,925 | * 5/1985 | Fukasawa | 360/67 X |
| 5,173,826 | * 12/1992 | Bischoff | 360/123 X |

(List continued on next page.)

FOREIGN PATENT DOCUMENTS

| | | | |
|---|---|---|---|
| 0 483 844 | 5/1992 | (EP) | G03B/17/24 |
| 4-134701 | 5/1992 | (JP) | G11B/5/02 |
| 6-84118 | 3/1994 | (JP) | G11B/5/09 |
| 07219021 | 8/1995 | (JP) | G03B/17/24 |
| 8-29863 | 2/1996 | (JP) | G03B/17/24 |

OTHER PUBLICATIONS

Patent Abstracts of Japan, vol. 016, No. 404 (P–1410) May 8, 1992, Tadashi, Information Recording Method.
Patent Abstracts of Japan, vol. 018, No. 346 (P–1762), Mar. 25, 1994, Atsushi, Magnetic Recording/Reproducing Method.
Patent Abstracts of Japan, vol. 096, No. 006, Feb. 2, 1996, Kazuhiro, Camera.
Patent Abstracts of Japan, vol. 007, No. 005 (M–184), Oct. 12, 1982, Toshiaki, Magnetic Printer Device.
Patent Abstract of Japan, Magnetic Recorder for Camera, Wataru, Aug. 18, 1995.

*Primary Examiner*—Andrew L. Sniezek
(74) *Attorney, Agent, or Firm*—Sughrue, Mion, Zinn, Macpeak & Seas, PLLC

(57) ABSTRACT

A magnetic read-write device with a magnetic head consisting of a core and a coil. The read-write device is incorporated into in a camera. A writing circuit is connected directly and in parallel to the coil, for driving the coil with writing current in a writing mode for writing binary code data on a magnetic recording layer provided on photo film. The writing circuit has a pair of write control switches which are turned ON and OFF alternately to each other, to apply the writing current to the coil in alternating directions. An amplification circuit is also connected directly and in parallel to the coil. The amplification circuit amplifies signal voltage induced between terminals of the coil in a reading mode for reading binary code data from the magnetic recording layer, to output a reproduction signal. A switching transistor is connected in a line through which a drive voltage is supplied to the amplification circuit. In the writing mode, the switching transistor is turned OFF to deactivate the amplification circuit. In the reading mode, the switching transistor is turned ON, and the write control switches are turned OFF.

5 Claims, 3 Drawing Sheets

U.S. PATENT DOCUMENTS

| | | | | |
|---|---|---|---|---|
| 5,335,029 | * | 8/1994 | Itoh et al. | 396/311 |
| 5,357,379 | * | 10/1994 | Gower | 360/62 X |
| 5,381,277 | * | 1/1995 | Jaffard et al. | 360/62 |
| 5,479,098 | * | 12/1995 | Yokoyama et al. | 360/31 X |
| 5,839,008 | * | 11/1998 | Tanaka et al. | 360/25 X |
| 5,856,889 | * | 1/1999 | Hibino et al. | 360/29 X |
| 5,987,267 | * | 11/1999 | Miyamoto et al. | 360/1 X |

* cited by examiner

DEVICE FOR READING AND WRITING DATA ON MAGNETIC RECORDING LAYER OF PHOTO FILM

BACKGROUND OF THE INVENTION

1. Field of the Invention

The present invention relates to a device for reading and writing data on magnetic recording layer provided on photo film, and more particularly to a magnetic read-write device suitable for incorporation into a camera.

2. Description of the Related Art

A new type photo film has been developed with a magnetic recording layer to permit recording information about each picture frame such as shutter speed and aperture size, the number of prints to make, and trimming range. A magnetic head incorporated in a camera is utilized for the recording on the photo film while it is advanced one frame after exposure, as disclosed for example in JPA 7-219021. The information recorded on the magnetic recording layer of the photo film is read by a magnetic head installed in a photo printer, for use in controlling the exposure therein.

Since the new type photo film is contained in a cartridge shell that allows to advance the leader of the photo film to the outside after winding up the entire length of the photo film, it is possible to wind up the photo film that is not completely exposed back into the cartridge shell and remove the cartridge from the camera to load it in another camera, or to replace it by another cartridge. When to use the cartridge containing the half-exposed photo film, it is necessary to search for an unexposed portion that follows to the still exposed frame, and place it behind an exposure aperture. By tracing the magnetic tracks on the magnetic recording layer that are formed along the exposed frames, it is possible to discriminate between exposed and unexposed portions of the photo film. Therefore, it is desirable to provide the camera for the new type photo film with a magnetic reading function. The magnetic reading function in the camera is desirable because it also permits checking the recording condition on the photo film immediately after the recording.

Because the photo filmstrips, especially the new type ones, are stiffer, and the magnetic recording layer on the photo film has lower magnetic density in comparison with ordinary magnetic recording tapes, it is desirable for stable and reliable reading to use a magnetic reading head with a large turn number. However, providing a reading head in addition to a recording head results in raising the cost, weight and size of the camera.

Using a magnetic head for both reading and writing simply by increasing its turn number is possible, but the reliability of that magnetic head cannot be sufficient because the current through the coil of the head decreases with an increase of the direct current resistance that increases with the turn number, so that the current is more influenced by the noises. To use thicker wire to lower the direct current resistance of the coil enlarges the magnetic head.

A read-write magnetic head with a reading coil and a writing coil on a core is known, wherein the reading coil has a larger turn number, and the coils are used alternatively so that the signal is reproduced at sufficiently high level, while the current for writing is maintained in a proper level. There are four-terminal type read-write head and three-terminal type read write-head. In the four-terminal type, the reading coil is separate from the writing coil, both having respective terminals. In the three-terminal type, the reading coil is included in the writing coil.

In either case, the turn number of the reading coil is usually more than ten times that of the writing coil. Therefore, when the writing coil is driven with a voltage of about 3 volt, for instance, voltage of several tens volt will be induced between the terminals of the reading coils. Such an induced voltage or current would break down operation amplifiers that are connected to the reading coil to amplify the reproduced signal. To protect the operation amplifiers from the induced voltage, a protection circuit is connected between an inverting input terminal and a non-inverting input terminal of a preamplifier. The protection circuit has a pair of Zener diodes oriented reversely and connected in series or in parallel to each other. Otherwise, it is necessary to provide a selector switch to disconnect the coil of the magnetic head from the amplification circuit during the writing, and from a head drive circuit during the reading.

Connecting the protection circuit or the selector switch in the input of the amplification circuit that amplifies the reproduced signal can put a certain noise on the reproduced signal. Moreover, the Zener diodes or the selector switch and the magnetic head having the two kinds of coils on the single core itself are relatively expensive.

SUMMARY OF THE INVENTION

In view of the foregoing, a prime object of the present invention is to provide a magnetic read-write device with a single read-write magnetic head for reading data from a magnetic recording layer provided on photo film or for writing data on the magnetic recording layer, which is compact and achieves a high performance at a low cost without the need for connecting an expensive Zener diode protection circuit or a selector switch in the input stage of the amplification circuit.

According to the invention, the above object is achieved by a magnetic read-write device that comprises a magnetic head consisting of a core and a coil and mounted to be accessible to the magnetic recording layer; a writing circuit connected directly and in parallel to the coil, for applying writing current to the coil in a writing mode; an amplification circuit connected directly and in parallel to the coil, for amplifying signal voltage induced between terminals of the coil in a reading mode, to output the amplified signal voltage as a reproduction signal; and a switching device connected in a line through which a drive voltage is supplied to the amplification circuit, the switching device being turned off to deactivate the amplification circuit in the writing mode.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein.

DETAILED DESCRIPTION OF THE PREFERRED EMBODIMENTS

Figure 1:
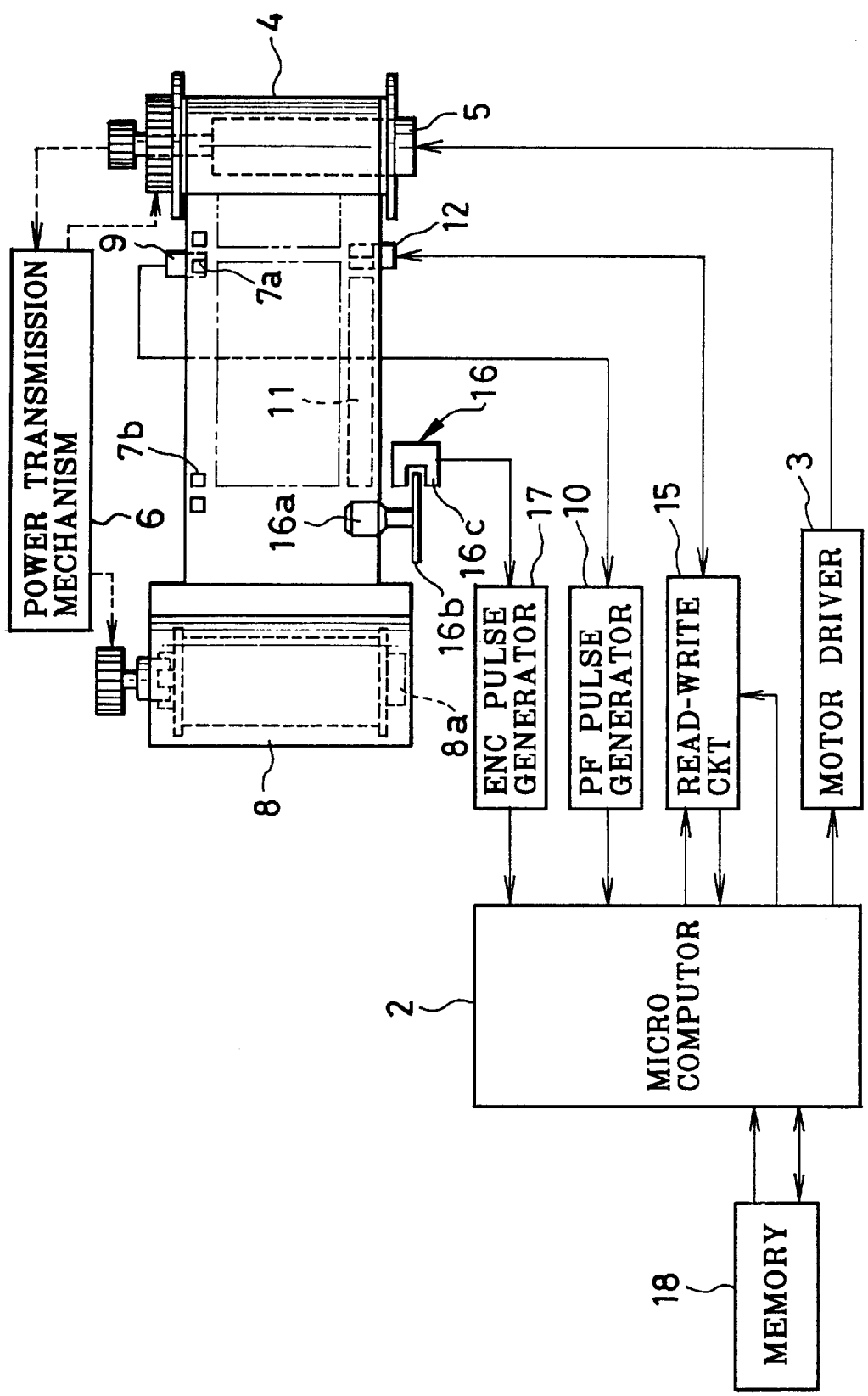
FIG. 1 schematically shows the overall structure of a camera having a magnetic reading and writing device according to an embodiment of the present invention, wherein binary data is recorded on a magnetic recording track that is provided for each frame on a photo film.

In FIG. 1, a motor 5 is incorporated in a take-up spool 4 of a camera. Initially, a microcomputer 2 commands a motor driver 3 to drive the motor 5 in a direction to rotate the take-up spool 4 in a winding direction through a power transmission mechanism 6. The power transmission mechanism 6 can transmit the rotational power of the motor 5 to a spool 8a of the cartridge shell 8 to rotate the spool 8a in an unwinding direction to advance a photo filmstrip 7 out of a cartridge shell 8. After the leader of the photo filmstrip 7 is coiled about the take-up spool 4 sufficiently, the photo filmstrip 7 starts being taken up onto the take-up spool 4 as it rotates at a higher speed than the spool 8a. The motor 5 stops when a first frame to expose is placed in an exposure position. Thereafter, the photo filmstrip 7 is wound up one frame after each exposure from the cartridge shell 8 onto the take-up spool 4. When to rewind the photo filmstrip 7 into the cartridge shell 8, the motor 5 is driven reversely to rotate the spool 8a in a winding direction, while the take-up spool 4 is disconnected from the motor 5.

The photo filmstrip 7 has a pair of perforations 7a and 7b per frame which are arranged along one side of the filmstrip 7. A reflective photosensor 9 is disposed in the course of the perforations 7a and 7b. The photosensor 9 outputs a photoelectric signal to a perforation (PF) pulse generator 10, which outputs a perforation pulse to the microcomputer 2 upon detection of one perforation. To advance the filmstrip 7 by one frame, the microcomputer 2 stops driving the motor 5 when the photosensor 9 detects the first perforation 7a of each pair.

A magnetic recording layer is applied on the entire back surface of the photo filmstrip 7. While the photo filmstrip 7 is advanced one frame, a magnetic head 12 is driven to record photographic information in the form of binary code data on a magnetic track 11 along the opposite side of each exposed frame from the perforations 7a and 7b.

Figure 2:
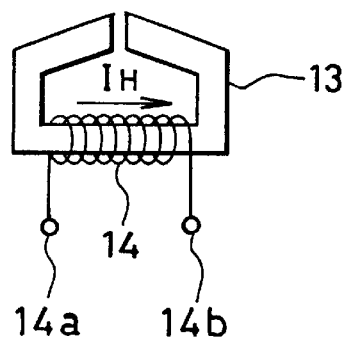
FIG. 2 shows a magnetic head.

The magnetic head 12 is composed of a single core 13 and a single coil 14 as shown in FIG. 2. Since the current flows throughout the coil 14 for both reading and writing, the magnetic head 12 does not involve the above described problem that occurs in those magnetic heads which have reading and writing coils on a core, the problem that the current flowing through the writing coil induces current in the reading coil. The coil 14 is connected to a read-write circuit 15. The read-write circuit 15 generates data pulses at varying pulse duty factors dependent upon a writing signal from the microcomputer 2. In accordance with the data pulses, the magnetic head 12 writes binary code data on the magnetic recording layer of the filmstrip 7.

An encoder 16 is provided for detecting the advance speed of the filmstrip 7. The encoder 16 is constituted of a roller 16a rotated along with the filmstrip 7 being advanced, an encode plate 16b having radial slits at regular intervals and rotating with the roller 16a, and a photosensor 16c that detects light passing through the slits of the encode plate 16b. While the roller 16a and the encode plate 16b rotate, the photosensor 16c outputs an intermittent photoelectric signal to an encode (ENC) pulse generator 17. The ENC pulse generator 17 outputs an encode pulse each time the filmstrip 7 is advanced by a unit length that is determined by the slit interval. The encode pulses are fed to the microcomputer 2.

The microcomputer 2 determines the film advance speed by the encode pulses, and outputs the writing signal to the read-write circuit 15 synchronously with the film advance. The read-write circuit 15 inverts the magnetic field of the magnetic head 12 at proper timings within a cycle that varies depending upon the film advance speed such that each bit is recorded in the same length along the magnetic track 11.

Figure 3:
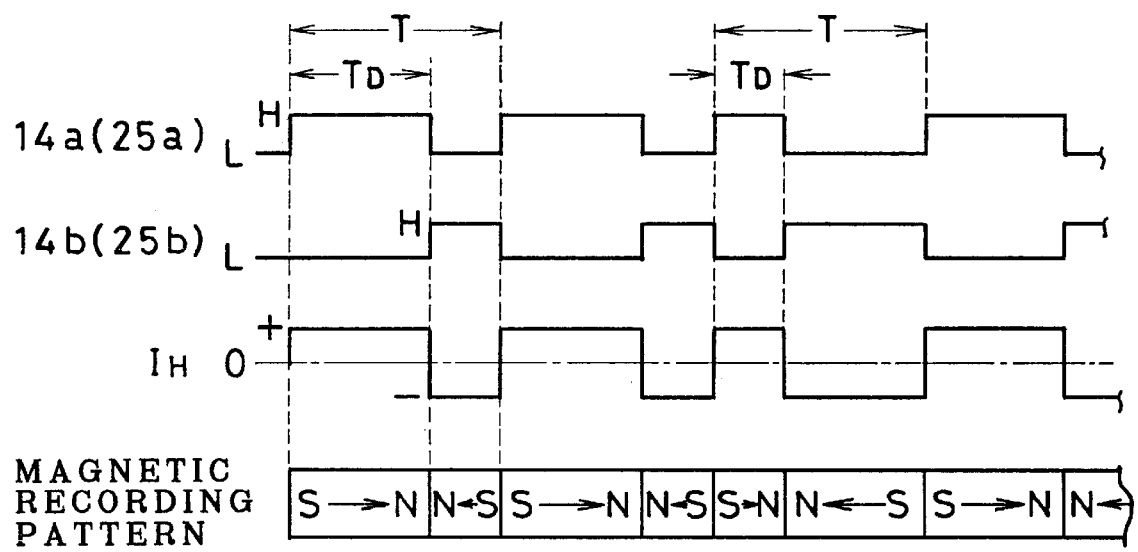
FIG. 3 shows timing charts illustrating the operation of the magnetic recording device.

FIG. 3 shows an example of binary code data recorded along the magnetic track 11. As shown, the binary code data is recorded in the form of a serial magnetic pattern. Each bit of the binary code data is recorded as a bit segment, and each bit segment is constituted of a forward magnetic zone indicated by "S→N", and a succeeding reverse magnetic zone indicated by "N←S". Timing charts indicated by 14a and 14b show voltages applied at opposite terminals 14a and 14b of the coil 14 respectively, and a timing chart indicated by Ih shows the direction of current Ih flowing through the coil 14 for the writing, wherein the positive represents the direction shown by an arrow in FIG. 2. When the current Ih flows in the positive direction, the magnetic recording layer is magnetized in the forward direction.

In FIG. 3, a time interval T corresponds to the pulse spacing of the data pulses, and a time interval $T_d$ corresponds to the pulse width of the data pulses. The length of one bit segment is the advanced length of the filmstrip 7 in the time interval T. To maintain the length of the bit segments constant, the microcomputer 2 controls the pulse spacing T in accordance with the film advance speed detected from the encode pulses. The length of one forward magnetic zone is the advanced length of the filmstrip 7 in the time interval $T_d$, and the time interval $T_d$ varies depending upon whether the bit to record is "1" or "0". That is, $T_d/T$ varies with the pulse duty factor of the data pulse from the read-write circuit 15 in accordance with the binary values designated by the writing signal. For the sake of clarity, the time interval T for recording one bit segment and the time interval $T_d$ for recording one forward magnetic zone are illustrated to be equal to the physical length of the bit segment and the corresponding forward magnetic zone.

The binary "1" or "0" depends upon whether the pulse duty factor is more than 50% or less than 50%. For example, $T_d/T$ is more than 0.5 for binary "1", whereas $T_d/T$ is less than 0.5 for binary "0".

A memory 18 connected to the microcomputer 2 includes a ROM section and a RAM section. The ROM section of the memory 18 stores programs for a writing sequence, a reading sequence and so force, and tables for converting information into binary code data recordable along the magnetic recording track 11. The photographer can select the information to record for each frame prior to the exposure. The RAM section of the memory 18 is used for temporary storage of data or flags during the execution of each sequence.

Figure 4:
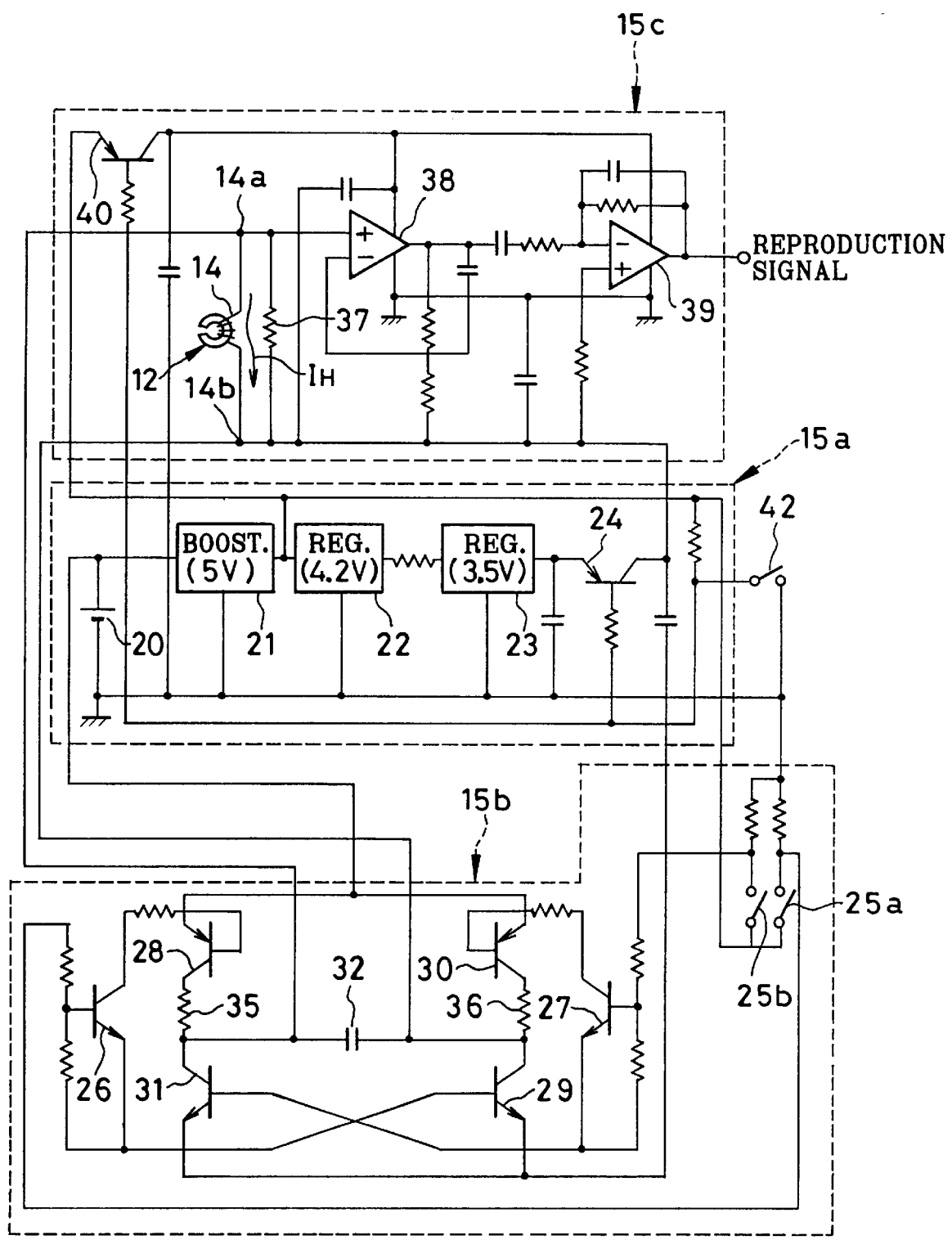
FIG. 4 shows a circuit diagram of a read-write circuit including the magnetic head of FIG. 3, according to the embodiment of FIG. 1.

FIG. 4 shows an embodiment of the read-write circuit 15. The read-write circuit 15 consists of a power source circuit 15a, a writing circuit or head drive circuit 15b and an amplification circuit 15 for amplifying reproduced signal from the magnetic head 12. The power source circuit 15a includes a battery 20, e.g. a lithium battery of 3 V, that also supplies other circuits of the camera, such as a shutter drive circuit and those shown in FIG. 1. The battery voltage is transformed into a drive voltage of 5 V and a reference voltage of 3.5 V through a booster 21 and regulators 22 and 23. A switching transistor 24 is connected to an output of the regulator 23, such that the reference voltage of 3.5 V is supplied from the regulator 23 to the amplification circuit 15c when the base of the switching transistor 24 is grounded. Two capacitors are provided in the power source circuit 15a, for protecting the reference voltage from high-frequency noises.

The writing circuit 15b controls the direction of the writing current $I_h$. A pair of write control switches 25a and 25b are provided for determining the time interval $T_d$ or the pulse width of the data pulse. For conducting writing current through the coil 14 of the magnetic head 12 in one direction or the other, the write control switches 25a and 25b take opposite ON-OFF states to each other in an alternating fashion in accordance with the writing signal from the microcomputer 2. The write control switches 25a and 25b may be switching transistors or other elements.

In correspondence with the ON-OFF states of the write control switches 25a and 25b, switching transistors 26 and 27 are alternately turned ON. When the switching transistor 26 is ON and the switching transistor 27 is OFF, transistors 28 and 29 are turned ON, conducting the writing current $I_h$ in the positive direction through the coil 14 of the magnetic head 12, as shown in FIG. 4. Thereby, a forward magnetic zone is formed on the magnetic track 11. When the switching transistor 26 is OFF and the switching transistor 27 is ON, transistors 30 and 31 are turned ON, conducting the writing current $I_h$ in the opposite or negative direction through the coil 14. Thereby, a reverse magnetic zone is formed on the magnetic track 11. A bypass capacitor 32 is connected in parallel to the coil 14, to protect the writing current $I_h$ from high-frequency noises.

The magnitude of the writing current $I_h$ is determined by the battery voltage, the resistance values of resistors 35 and 36, and the resistance value of the coil 14. According to the invention, the DC resistance of the coil 14 can be several tens ohms that is remarkably small compared with ordinary audio magnetic head whose DC resistance is about several hundreds ohms. The resistors 35 and 36 are provided for protecting the coil 14 from excessively large current. One of the two resistors 35 and 36 is connected in series to the coil 14 depending on the direction of the writing current $I_h$. For the sake of proper writing and reading, the diameter and the turn number of the coil 14 are determined such that the DC resistance of the coil 14 is several tens ohms and the ampere-turn (AT) is not less than 3, and preferably 5 or more.

The amplification circuit 15c is connected to the magnetic head 12 in parallel to the writing circuit 15b. The amplification circuit 15c has a resistor 37 which converts reproduced current from the coil 14 into a voltage signal. The voltage signal is amplified through a non-inverting operation amplifier 38 and an inverting operation amplifier 39, for use as the reproduction signal. The amplifiers 38 and 39 may be commercially available operation amplifiers that have protection resistors in their input stages for preventing electrostatic breakdown.

Besides feed-back circuits and high-frequency-noise cutting-off capacitors, which are involved in the amplifiers 38 and 39, the amplification circuit 15c further has a switching transistor 40. The switching transistor 40 is connected in a supply line from the power source circuit 15a, for cutting or conducting the drive voltage (5 V) from or to the amplifiers 38 and 39. When the switching transistor 40 is OFF, the amplifiers 38 and 39 are deactivated because they are not supplied with the drive voltage.

When the magnetic head 12 is used for writing, the microcomputer 2 turns off a switch 42 that is connected to the base of the switching transistor 40, to turn off the switching transistor 40. The switch 42 may be a transistor. When the magnetic head 12 is used for reading, the microcomputer 2 turns on the switch 42 and thus the switching transistor 40, and keeps the write control switches 25a and 25b both in the OFF states, because the reference voltage of the amplification circuit 15c would be short-circuited to the earth of the writing circuit 15 if either of the write control switches 25a and 25b is ON.

The camera having the above described configuration operates as follows:

When an unexposed photo film cartridge is loaded in the camera, the camera determines that the loaded photo film cartridge is unexposed with reference to a not-shown signal disc on the spool 8a. Then the camera opens a not-shown door member of the cartridge shell 8 to enable the leader of the photo filmstrip 7 to go through a film mouth of the cartridge shell 8. The motor driver 3 is driven to rotate the motor 5 in the direction to rotate the spool 8a in the unwinding direction through the power transmission mechanism 6. After the leader is turned around the take-up spool 4, the filmstrip 7 begins to be wound on the take-up spool 4 by the rotation of the take-up spool 4.

Since the filmstrip 7 is unexposed, the microcomputer 2 operates the read-write circuit 15 in a writing mode. In the writing mode, the switch 42 is turned OFF, to keep the switching transistor 24 in the OFF state and block the reference voltage from the amplifiers 38 and 39. Responsive to the switch 42 being OFF, also the switching transistor 40 is kept in the OFF state and block the drive voltage from the amplifiers 38 and 39. To write data on the leader of the filmstrip 7, the microcomputer 2 sends a writing signal to the read-write circuit 15 synchronously with the encode pulses from the ENC pulse generator 17. To write data after each exposure along the magnetic track 11, the microcomputer 2 sends a writing signal to the read-write circuit 15 synchronously with the encode pulses, and with reference to the perforation pulses from the PF pulse generator 10.

In accordance with the writing signal, the write control switches 25a and 25b are turned ON and OFF alternately to each other. For instance, to record data in the magnetic pattern as shown in FIG. 3, the write control switch 25a is turned ON and the write control switch 25b is turned OFF for a time interval $T_d$ that is longer than a half of the time interval T. In result, the terminal 14a of the coil 14 takes a high voltage level, and the other terminal 14b takes a low voltage level, so that the writing current $I_h$ flows in the positive direction shown by the arrow in the drawings. Thereafter, the write control switches 25a and 25b invert their ON-OFF states for a time interval "T–$T_d$", to conduct the writing current $I_h$ in the negative direction. In this way, a longer forward magnetic zone and a shorter reverse magnetic zone are recorded in a first bit segment, representing binary "1".

A second bit segment is recorded in the same way as the first bit segment to represent binary "1". To record a third bit segment as representative of binary "0", the write control switch 25a is turned ON and the write control switch 25b is turned OFF for a time interval $T_d$ that is shorter than a half of the time interval T. Thereafter, the switching positions of the write control switches 25a and 25b are inverted for a time interval "T–$T_d$". In this way, a shorter forward magnetic zone and a longer reverse magnetic zone are recorded in the third bit segment, representing binary "1".

Since the DC resistance of the coil 14 is so small, i.e. several tens ohms, it is possible to obtain a sufficient level of the writing current $I_h$ from the limited power source voltage. Since the protection resistors 35 and 36 are provided in the amplification circuit 15c, even through the amplification circuit 15c is connected directly to the terminals 14a and 14b of the coil 14, there is no danger that extremely large voltage is applied to the preamplifier 38. Accordingly, there is no need for providing a selector switch in between the coil 14 and the amplification circuit 15c, nor a protection circuit consisting of expensive Zener diodes in the input of the amplification circuit 38.

To rewind the photo filmstrip 7 back into the cartridge shell 8, the motor 5 is driven to rotate the spool 8a in the winding direction. After the filmstrip 7 is fully wound into the cartridge shell 8, the door member is closed to shield the photo filmstrip 7 from ambient light. If the filmstrip 7 still has unexposed frames, the microcomputer 2 controls the motor 5 to stop the spool 8a at a position where the signal disc indicates that the filmstrip 7 contained in the cartridge shell 8 is not completely exposed. Also when the filmstrip 7 is completely exposed, the rotational position of the spool 8a and thus the signal disc is adjusted to indicate that.

When the half-exposed photo film cartridge is reloaded, the camera detects the exposure condition through the signal disc, and sets the read-write circuit 15 first in a reading mode. In the reading mode, the write control switches 25a and 25b are both turned OFF, and the switch 42 is turned ON. Thereby, the switching transistors 24 and 40 are turned ON to supply the amplification circuit 15c with the reference voltage (3.5 V) and the drive voltage (5 V), activating the amplification circuit 15c.

While the filmstrip 7 is transported, the magnetic head 12 traces the magnetic track 11 of the leader and the magnetic tracks 11 on the side of the exposed frames. As the forward magnetic zones and the alternating rearward magnetic zones pass by the magnetic head 12, alternating current flows through the coil 14. The reproduced current is converted through the resistor 37 into the voltage signal. The voltage signal is amplified through the amplifiers 38 and 39, and is sent as the reproduction signal to the microcomputer 2.

Since the reproduction signal represents the binary code data recorded on the magnetic tracks 11, the microcomputer 2 can read the recorded information from the reproduction signal with reference to the conversion tables stored in the ROM section of the memory 18. The reproduced information may be displayed on a monitor of the camera, such as a liquid crystal display panel. The microcomputer 2 also counts the frame number based on the perforation pulses from the PF pulse generator 10, and checks if the format of the recorded magnetic pattern is proper or not, e.g. if each bit segment has the same length.

When the unexposed portion of the filmstrip 7 moves to the magnetic head 12, the amplification circuit 15c cannot output any reproduction signal. Then, the microcomputer 2 stops the motor 5 and then drives it reversely to move the filmstrip 7 backward while keeping the amplification circuit 15c in the active state. When the magnetic head 12 detects the magnetic track 11 again and thereafter one perforation 7a is detected in this backward transport, the motor 5 is stopped again. Thereby the latest exposed frame of this filmstrip 7 stops at the exposure position.

By advancing the filmstrip 7 one frame amount in the same way as in the ordinary photography operation, an unexposed frame adjacent to the latest exposed frame is placed in the exposure position. Then, the microcomputer 2 switches the read-write circuit 15 to the writing mode by turning the switch 42 OFF and enabling the write control switches 25a and 25b to operate in response to the writing signal from the microcomputer 2 in the same way as set force above.

As described so far, according to the invention, the read-write circuit 15 can be set in the reading mode simply by turning the write control switches 25a and 25b ON, and the switch 42 OFF. This configuration permits keeping connecting the writing circuit 15b and the amplification circuit 15c directly and in parallel to both terminals 14a and 14b of the coil 14. That is, there is no need for a selection switch that alternatively connects the terminals 14a and 14b of the coil 14 either to the writing circuit 15b or the amplification circuit 15c. Therefore, the read-write circuit 15 according to the invention is advantageous in view of production cost. Since the reproduced current flows from the coil 14 directly to the amplification circuit 15, the reproduced current does not suffer the noises that would be generated from the selection switch. Owing to the low DC resistance of the coil 14, the reproduced current has a sufficient magnitude so that the reproduction signal has a good S/N ratio.

Although the present invention has been described in detail with respect to the embodiment shown in the drawings, the scope of the present invention should not be limited to this embodiment. For example, the booster 21 can be omitted when the power source voltage is 6 volts. The concrete circuit elements of the read-write circuit 15 may be modified appropriately. The present invention is applicable to photo-printers as well as to cameras. Thus, variations and modifications of the present invention are possible without departing from the scope of claims attached hereto.

What is claimed is:

1. A magnetic read-write device for reading data from a magnetic recording layer provided on photo film in a reading mode or for writing data on the magnetic recording layer in a writing mode, comprising:

a single magnetic head consisting of a core and a coil and mounted to be accessible to the magnetic recording layer;

a writing circuit connected directly and in parallel to the coil, for applying writing current to the coil in the writing mode;

an amplification circuit connected directly and in parallel to the coil, for amplifying signal voltage induced between terminals of the coil in the reading mode, to output the amplified signal voltage as a reproduction signal; and a single switching device connected in a line through which a drive voltage is supplied to the amplification circuit, the switching device being turned off to deactivate the drive voltage supplied to the amplification circuit in the writing mode.

2. A magnetic read-write device as claimed in claim 1, wherein the read-write device is incorporated into a camera, and is supplied from a battery that supplies other electric elements of the camera.

3. A magnetic read-write device as claimed in claim 2, further comprising a power source circuit for obtaining from a power source voltage of the battery the drive voltage and a reference voltage necessary for activating the amplification circuit.

4. A magnetic read-write device as claimed in claim 1, wherein the writing circuit comprises a pair of write control switches which are alternately turned ON and OFF in the writing mode to conduct the writing current in alternating directions through the coil to magnetize the magnetic recording layer in alternating directions along a track, both of the write control switches being turned OFF in the reading mode.

5. A magnetic read/write device for reading data from a magnetic recording layer provided on photofilm in a reading mode or for writing data on the magnetic recording layer in a writing mode, comprising:

a magnetic head consisting of a core and a coil and mounted to be accessible to the magnetic recording layer;

a writing circuit connected directly and in parallel to the coil, for applying writing current to the coil in the writing mode;

and amplification circuit connected directly and in parallel to the coil, for amplifying signal voltage induced between terminals of the coil in the reading mode, to output the amplified signal voltage as a reproduction signal; and a switching device connected in a line through which a drive voltage is supplied to the amplification circuit, the switching device being turned off to deactivate the amplification circuit in the writing mode, wherein the coil has a direct current resistance of several tens ohms and an ampere turn of three to five.

* * * * *